(12) United States Patent
Liu et al.

(10) Patent No.: US 9,315,392 B2
(45) Date of Patent: *Apr. 19, 2016

(54) METHOD FOR PREPARING MAGNETIC IRON OXIDE

(75) Inventors: Zhenyi Liu, Beijing (CN); Lixian Wang, Beijing (CN)

(73) Assignee: BEIJING SJ ENVIRONMENT PROTECTION AND NEW MATERIAL CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/369,647

(22) PCT Filed: May 21, 2012

(86) PCT No.: PCT/CN2012/075809
§ 371 (c)(1),
(2), (4) Date: Jun. 27, 2014

(87) PCT Pub. No.: WO2013/097403
PCT Pub. Date: Jul. 4, 2013

(65) Prior Publication Data
US 2014/0361213 A1 Dec. 11, 2014

(30) Foreign Application Priority Data
Dec. 29, 2011 (CN) .......................... 2011 1 0450768

(51) Int. Cl.
C01G 49/00 (2006.01)
C01G 49/02 (2006.01)
C01G 49/06 (2006.01)
H01F 1/01 (2006.01)

(52) U.S. Cl.
CPC ................ *C01G 49/02* (2013.01); *C01G 49/06* (2013.01); *H01F 1/01* (2013.01); *C01P 2002/72* (2013.01); *C01P 2006/42* (2013.01)

(58) Field of Classification Search
None
See application file for complete search history.

(56) References Cited

U.S. PATENT DOCUMENTS

2008/0241055 A1 10/2008 Kawase et al.
2011/0256044 A1* 10/2011 Liu et al. ...................... 423/234
2011/0260102 A1 10/2011 Liu et al.

FOREIGN PATENT DOCUMENTS

| CN | 1049142 A | 2/1991 |
| CN | 101274781 A | 10/2008 |
| CN | 101585557 A | 11/2009 |
| CN | 101767829 A | 7/2010 |
| CN | 101767831 | 7/2010 |

OTHER PUBLICATIONS

Partial Translation of CN 101585557A, embodiment 5, Nov. 2009.*
"Preparation and Property Evaluation of Ambient Temperature Desulfurizer Iron Oxide Hydroxide," National Information Center ot Gas Purification, Proceedings on Technical Seminar, 2010, pp. 68-71 (with English language translation).
Zhi-jian Gong, et al., "Research on Desulfurization Activity of Iron Oxyhydroxide Prepared with Different Alkali Ratios," Coal Science and Technology, vol. 34, No. 10, (Oct. 2006) pp. 44-46 (with English translation).

* cited by examiner

*Primary Examiner* — Steven Bos
(74) *Attorney, Agent, or Firm* — Birch, Stewart, Kolasch & Birch, LLP

(57) ABSTRACT

A method for preparing magnetic iron oxide $Fe_{21.333}O_{32}$, comprising the following steps: (1) preparing a ferrous salt solution with solid soluble ferrous salt; (2) preparing a hydroxide solution; (3) mixing said hydroxide solution and said ferrous salt solution in a co-current manner for reaction at an alkali ratio of 0.6-0.8 and a reaction temperature not exceeding 30° C.; (4) after the reaction in step (3) is finished, yielding a first mixture, then charging said first mixture with a gas containing oxygen for oxidation, and controlling the first mixture at a pH value of 6-8 until the oxidation is finished to yield a second mixture; (5) filtering, washing with water and drying said second mixture obtained in step (4) to yield a precursor; and (6) calcining the precursor obtained in step (5) at 250-400° C.

18 Claims, 1 Drawing Sheet

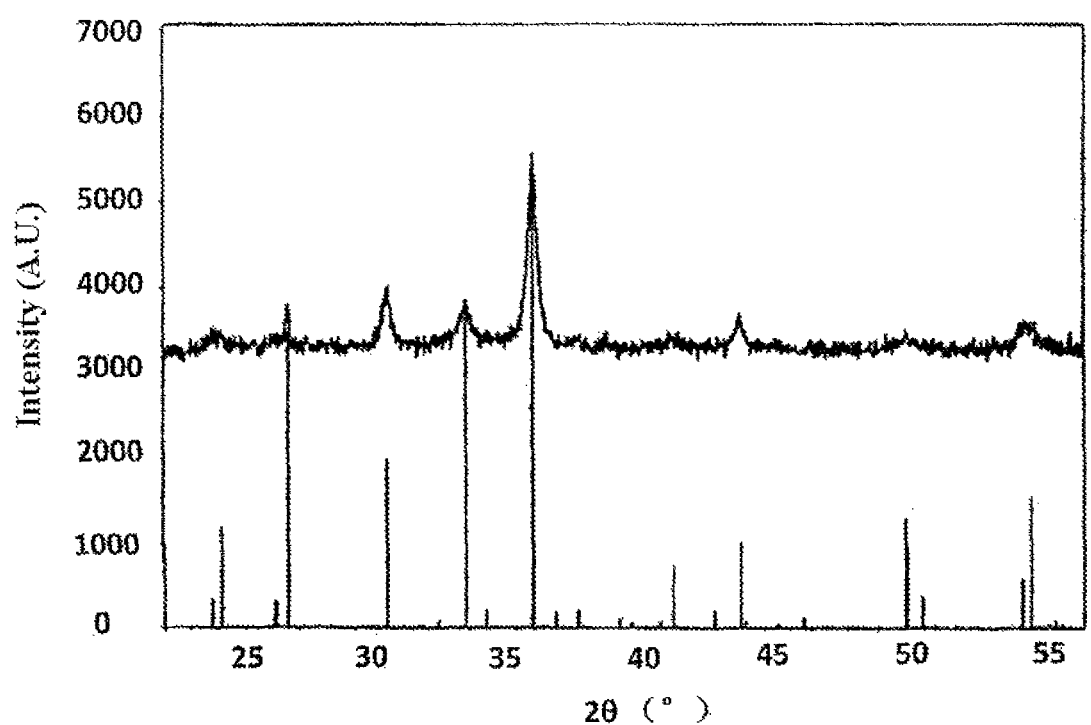

METHOD FOR PREPARING MAGNETIC IRON OXIDE

TECHNICAL FIELD

The present invention relates to method for preparing magnetic iron oxide $Fe_{21.333}O_{32}$, belonging to a technical field of desulfurization.

BACKGROUND OF THE INVENTION

The applicant has been committed to desulfurization property study of amorphous iron oxide hydroxide and has published an article titled "Preparation and property evaluation of ambient temperature desulfurizer iron oxide hydroxide" (referring to pages 68-71, National Information Center of Gas Purification, Proceedings on Technical Seminar, 2010). This article discloses a laboratory preparation thought of amorphous iron oxide hydroxide, and verifies the desulfurization and regeneration mechanism of the amorphous iron oxide hydroxide through experimental data. However, this study is still at the laboratory exploration stage, and the final objective of this study is to achieve a mass production of amorphous iron oxide hydroxide with high purity and high sulfur capacity in industrial production.

However, so far, amorphous iron oxide hydroxide desulfurizer is not commonly used in practice. The so-called amorphous iron oxide hydroxide desulfurizers sold in the market have poor desulfurization property and are difficult to he regenerated due to low purity of amorphous iron oxide hydroxide (lower than 40%) and high content of other non-regenerative iron oxides (ferroferric oxide, ferric oxide or iron oxide hydroxide in other crystalline states).

In prior art, a reference titled "Research on desulfurization activity of iron oxyhydroxide prepared with different alkali ratios" was published on Coal Science and Technology, Vol. 34 No. 10, October of 2006. This reference provides a preparation method of amorphous iron oxide hydroxide, which comprises following steps: A certain amount of distilled water and ferrous salt are added into a reactor and stirred, and nitrogen is passed into the reactor for protection. After the ferrous salt is dissolved, according to an alkali ratio of 1, a certain amount of alkali solution is dropped into. After the alkali solution dropping is finished, nitrogen is replaced with air for oxidation reaction, and when the conversion rate of $[Fe^{3+}]/[\Sigma Fe]$ reaches 100% and when the color of the solution observed by paper chromatography does not change further, the oxidation reaction is finished. The sample is washed to remove $Na^+$ contained therein, obtaining a filter cake of amorphous iron oxide hydroxide. The amorphous iron oxide hydroxide prepared under the above mentioned conditions has low purity, and contains a large amount of iron oxides and iron oxide hydroxide in other crystalline states, which results in low purity, low sulfur capacity and non-regenerative characteristic when the generated amorphous iron oxide hydroxide is used as a desulfurizen The reasons for these problems are that, the preparation of amorphous iron oxide hydroxide is strongly influenced by preparation conditions such as pH value, temperature, feeding speed and so on, and small changes on preparation conditions will result in big difference on contents of amorphous iron oxide hydroxide, iron oxides and iron oxide hydroxide in other crystalline states. Therefore, it is very difficult to explore preparation conditions which allow preparation of amorphous iron oxide hydroxide with high purity and high sulfur capacity.

The applicant disclosed that the amorphous iron oxide hydroxide may he used to prepare the magnetic iron oxide $Fe_{21.333}O_{32}$ in his patent article filed in 2008 with a publication No. CN101585557A. However, if the amorphous iron oxide hydroxide in above mentioned reference is used to prepare the magnetic iron oxide, on the one side, the purity of amorphous iron oxide hydroxide will be low; on the other side, the preparation method of amorphous iron oxide hydroxide disclosed by the above mentioned reference is a laboratory method, which needs nitrogen protection and has a complex preparation process and a high production cost, so is not applicable to industrial production.

SUMMARY OF THE INVENTION

In order to solve the problems that it is not applicable to industrial production to prepare the magnetic iron oxide using amorphous iron oxide hydroxide of prior art, as the amorphous iron oxide hydroxide has low purity and the preparation method of amorphous iron oxide hydroxide of prior art is a laboratory method, which needs nitrogen protection and has a complex preparation process and a high production cost. The applicant provides a method for preparing amorphous iron oxide hydroxide with high purity in present invention, and then provides a new method to produce magnetic iron oxide $Fe_{21.333}O_{32}$.

The technical solution of the method for preparing magnetic iron oxide of the present invention is described as below A method for preparing magnetic iron oxide $Fe_{21.333}O_{32}$, comprising following steps:
(1) preparing a ferrous salt solution with solid soluble ferrous salt;
(2) preparing a hydroxide solution;
(3) mixing said hydroxide solution and said ferrous salt solution in a co-current manner for reaction, controlling said hydroxide solution and said ferrous salt solution at an alkali ratio (which refers to a ratio of the equivalent concentration of the hydroxide solution to the equivalent concentration of the ferrous salt solution) of 0.6~0.8 and controlling a reaction temperature not exceeding 30° C.;
(4) after the reaction in step (3) is finished, yielding a first mixture. charging the first mixture with a gas containing oxygen for oxidation, and controlling the first mixture at a pH value of 6~8 until the oxidation is finished to yield a second mixture;
(5) filtering, washing with water and drying said second mixture obtained in step (4) to yield a precursor; and
(6) calcining the precursor obtained in step (5) at 250~400° C.

In a class of this embodiment, the calcining temperature in step (6) is 300~350° C.

In a class of this embodiment, said hydroxide is a hydroxide of group IA or group IIA elements.

In a class of this embodiment, said ferrous salt solution has a concentration of 1.3-1.8 mol/L, and said hydroxide solution has a concentration of 4-6 mol/L.

In a class of this embodiment in step (4), a hydroxide solution is used to control the first mixture at a pH value of 6~8.

In a class of this embodiment, in step (4), the hydroxide solution has a concentration of 4-6 mol/L and a feeding speed of 10-20 ml/min.

In a class of this embodiment, in step (3), said ferrous salt solution has a feeding speed controlled at. 200-300 ml/min, and said hydroxide solution has a feeding speed con trolled at 50-60 ml/min.

In a class of this embodiment, the alkali ratio of the hydroxide solution added in steps (3) and (4) and said ferrous salt solution is 1.05-1.25.

In a class of this embodiment, in step (5), said drying is carried out at a temperature not exceeding 90° C.

In a class of this embodiment, in step (4), water is added into the first mixture before charging the first mixture with a gas containing oxygen for oxidation.

In a class of this embodiment, in step (4), the oxidation lasts for 10-15 h.

In a class of this embodiment, in step (4), the gas containing oxygen is air, and the introduction amount or air is not less than 700 L/h.

In the method for preparing magnetic iron oxide $Fe_{21.333}O_{32}$ of the present invention, the amorphous iron oxide hydroxide may he generated through steps (1)-(5), and the preparation of amorphous iron oxide hydroxide may be deemed to include two stages.

In a first stage, $Fe^{2+}$ precipitates to generate $Fe(OH)_2$, and in a second stage, $Fe(OH)_2$ is oxidized by air to generate FeOOH. After research the applicant finds that, the particle size and generation environment of $Fe(OH)_2$ particles before oxidation will affect the purity and property of the amorphous iron oxide hydroxide obtained. Therefore, there are two key factors in the first stage; the first factor is the reaction temperature, and the second factor is the alkali ratio of the hydroxide solution added and the ferrous salt solution added, because the alkali ratio will directly affect the particle size of the $Fe(OH)_2$ particles and the pH value of the solution. Through countless experiments and studies, the applicant of the present invention finds that feeding by controlling the alkali ratio of the hydroxide solution and the ferrous salt solution at 0.6~0.8 and controlling the reaction temperature not exceeding 30° C. can facilitate the generation of amorphous iron oxide hydroxide with high purity.

During the oxidation in the second stage, firstly, nucleation of FeOOH occurs on the surface of $Fe(OH)_2$ particles, and during the nucleation process, $Fe^{2+}$ will react to generate green rust having a chemical composition $[Fe_4^{II} Fe_2^{III} (OH)_{12}] \cdot [SO_4 \cdot 2H_2O]$. Green rust is an unstable compound, and may be oxidized into α, β, or γ-FeOOH, or amorphous iron oxide hydroxide, or $Fe_3O_4$ depending on oxidation speed, pH value and temperature. After study the applicant finds that controlling the conditions of the oxidation process can further promote the generation of amorphous iron oxide hydroxide. In detail, firstly, the pH value is adjusted to a range of 6~8, which can allow fast oxidation of $Fe(OH)_2$ and further facilitate the generation of amorphous FeOOH; if the pH value is too high, ferrite products such as FeO and $Na_2Fe_2O_4$ will be generated. Therefore, in the method of the present invention, the pH value is controlled at 6~8, which effectively improves the purity of amorphous FeOOH. Secondly, the reaction temperature is controlled not exceeding 30° C., because if the reaction temperature is too high, iron black will be easily generated.

Furthermore, in the method of the present invention, the concentration of the ferrous salt solution is controlled to be 1.3~1.8 mol/L, and the concentration of the hydroxide solution is controlled to be 4~6 mol/L; and the feeding speed of the ferrous salt solution is controlled to be 200-300 ml/min, and the feeding speed of the hydroxide solution is controlled to be 90-100 ml/min. Control of the concentration and feeding speed of the ferrous salt solution and the hydroxide solution can allow the alkali ratio of the raw materials to be maintained within a proper range. Here, the control of the feeding speed of the hydroxide solution is particularly important. Through research the inventors find that, if the feeding speed of the hydroxide solution is too fast, iron black will be easily generated by the reaction of the reactants, thus affecting the purity of the amorphous iron oxide hydroxide. In order to control the feeding speed of the hydroxide solution during the oxidation process, the present invention further defines that in step (4), the concentration of the hydroxide solution is 4-6 mol/L, and the feeding speed of the hydroxide solution is 10-20 ml/min. The amorphous iron oxide hydroxide produced in present invention has a high purity which can reach 90-100%.

in the method for preparing magnetic iron oxide $Fe_{21.333}O_{32}$ of the present invention, the precursor obtained in step (5) is calcined at 250-400° C. in step (6), because the generated magnetic iron oxide $Fe_{21.333}O_{32}$ will have low purity if the calcining temperature is lower than 250° C., and the magnetism of the product will be reduced significantly if the calcining temperature is higher than 400° C., with a α-$Fe_2O_3$ easy to be generated. In order to guarantee the high purity and magnetism of the magnetic iron oxide $Fe_{21.333}O_{32}$ the calcining temperature is controlled at 250~400° C. in this invention, preferably 300~350° C.

The method for preparing magnetic iron oxide of the present invention has following advantages:
(1) The method for preparing magnetic iron oxide $Fe_{21.333}O_{32}$ is simple and may be applicable to industrial mass production.
(2) The magnetic iron oxide $Fe_{21.333}O_{32}$ produced by the method has a high purity, and therefore allows high sulfur capacity and regeneration when it is used as a desulfurizer.

DETAILED DESCRIPTION OF EMBODIMENTS

In order to make the present invention more easily and clearly understood, detailed description of the method fir preparing magnetic iron oxide is further presented below with reference of detailed embodiments.

Description of Figures

FIG. 1 is a XRD spectrogram of magnetic iron oxide $Fe_{21.333}O_{32}$ of the present invention.

EXAMPLE 1

The method for preparing magnetic iron oxide $Fe_{21.333}O_{32}$ in this example comprises following steps:
(1) 186.3 g solid $FeSO_4 \cdot 7H_2O$ is prepared into an aqueous solution having a concentration of 1.34 mol/L, and is placed in a beaker;
(2) 56.3 g solid NaOH is weighed out and is prepared into an aqueous solution having a concentration of 4.5 mol/L, and is placed in a beaker;
(3) the hydroxide solution and the ferrous salt solution are mixed in a co-current manner for reaction, wherein the alkali ratio of above reactants is 0.6 and the reaction temperature is controlled at 30° C., with controlling the ferrous salt solution at a feeding speed of 256 ml/min and the NaOH solution at a feeding speed of 91.5 ml/min;
(4) after the reaction in step (3) is finished, yielding a first mixture, 200 ml water is added into the first mixture, then blast pump is started to charge air into the first mixture for oxidation for about 10 hours with an introduction amount of air controlled at 700 L/h; and during the oxidation process, the pH value of the first mixture is controlled within a range of 6≤pH≤8, and when the pH value is lower than 6, the NaOH solution is added supplementarily at a feeding speed of 15 ml/min until the pH value reaches about 7.8; and the oxidation is deemed to he finished when the molar ratio of $Fe^{2+}/Fe_t$ is less than 1%, yielding a second mixture;

In this example, the alkali ratio of the hydroxide solution added in steps (3) and (4) totally and the ferrous salt solution is 1.05;

(5) the second mixture obtained in step (4) is filtered and washed with water until the content of $Na^+$ in obtained filter cake is less than 0.5%, and then is dried at 90° C. to yield amorphous iron oxide hydroxide;

(6) the amorphous iron oxide hydroxide obtained in step is calcined 250° C. to yield the product.

EXAMPLE 2

The method for preparing magnetic iron oxide $Fe_{21.333}O_{32}$ in this example comprises following steps:

(1) 250.3 g solid Fe $SO_4.7H_2O$ is prepared into an aqueous solution having a concentration of 1.8 mol/L, and is placed in a beaker;

(2) 90 g solid NaOH is weighed out and is prepared into an aqueous solution having a concentration of 4 mol/L, and is placed in a beaker;

(3) the hydroxide solution and the ferrous salt solution are mixed ire a co-current manner for reaction, wherein the alkali ratio of above reactants is 0.8 and the reaction temperature is 25° C., with controlling the ferrous salt solution at a feeding speed of 300 ml/min and the NaOH solution at a feeding speed of 216 ml/min;

(4) after the reaction in step (3) is finished, yielding a first mixture, 200 ml water is added into the first mixture, then blast pump is started to charge air into the first mixture for oxidation for about 10 hours with an introduction amount of air at 700 L/h; and during the oxidation process, the pH value of the first mixture is controlled within a range of $6 \leq pH \leq 8$, and when the pH value is lower than 6, the NaOH solution is added supplementarily at a feeding speed of 15 ml/min until the pH value reaches about 7.8; and the oxidation is deemed to be finished when the molar ratio of $Fe^{2+}/Fe_t$ is less than 1%. yielding a second mixture;

In this example, the alkali ratio of the hydroxide solution added in steps (3) and (4) totally and the ferrous salt solution is 1.25;

(5) the second mixture obtained in step (4) is filtered and washed with water until the content of $Na^+$ in obtained filter cake is less than 0.5%, and then is dried at 90° C. to yield amorphous iron oxide hydroxide;

(6) the amorphous iron oxide hydroxide obtained in step (5) is calcined at 400° C. to yield the product.

EXAMPLE 3

The method for preparing magnetic iron oxide $Fe_{21.333}O_{32}$ in this example comprises following steps:

(1) 250.3 g solid $FeSO_4.7H_2O$ is prepared into an aqueous solution having a concentration of 1.8 mol/L, and is placed in a beaker;

(2) 75 g solid NaOH is weighed out and is prepared into an aqueous solution having a concentration of 6 mol/L, and is placed in a beaker;

(3) the hydroxide solution and the ferrous salt solution are mixed in a co-current manner for reaction, wherein the alkali ratio of above reactants is 0.69 and the reaction temperature is controlled at 20° C., with controlling the ferrous salt solution at a feeding speed of 120 ml/min and the NaOH solution at a feeding speed of 50 ml/min;

(4) after the reaction in step (3) is finished, yielding a first mixture, 150 ml water is added into the first mixture, then blast pump is started to charge air into the first mixture for oxidation for about 10 hours with an introduction amount of air controlled at 700 L/h; and during the oxidation process, the pH value of the first mixture is controlled within a range of $6 \leq pH \leq 8$, and when the pH value is lower than 6, the NaOH solution is added supplementarily at a feeding speed of 15 ml/min until the pH value reaches about 7.8; and the oxidation is deemed to be finished when the molar ratio of $Fe^{2+}/Fe_t$ is less than 1%, yielding a second mixture;

In this example, the alkali ratio of the hydroxide solution added in steps (3) and (4) totally and the :ferrous salt solution is 1.05;

(5) the second mixture obtained in step (4) is filtered and washed with water until the content of $Na^+$ in obtained filter cake is less than 0.5%, and then is dried at 90° C. to yield amorphous iron oxide hydroxide;

(6) the amorphous iron oxide hydroxide obtained in step (5) is calcined at 300° C. to yield the product.

EXAMPLE 4

The method for preparing magnetic iron oxide $Fe_{21.333}O_{32}$ in this example comprises following steps:

(1) 180.7 g solid $FeSO_4.7H_2O$ is prepared into an aqueous solution having a concentration of 1.3 mol/L, and is placed in a beaker;

(2) 60 g solid NaOH is weighed out and is prepared into an aqueous solution having a concentration of 6 mol/L, and is placed in a beaker;

(3) the hydroxide solution and the ferrous salt solution are mixed in a co-current manner for reaction, wherein the alkali ratio of above reactants is 0.69 and the reaction temperature is controlled at 25° C., with controlling the ferrous salt solution at a feeding speed of 200 ml/min and the NaOH solution at a feeding speed of 60 ml/min;

(4) after the reaction in step (3) is finished, yielding a first mixture, 200 ml water is added into the first mixture, then blast pump is started to charge air into the first mixture for oxidation for about 15 hours with an introduction amount of air controlled at 720 L/h; and during the oxidation process, the pH value of the first mixture is controlled within a range of $6 \leq pH \leq 8$, and when the pH value is lower than 6, the NaOH solution is added supplementarily at a feeding speed of 10 ml/min until the pH value reaches about 7.8; and the oxidation is deemed to be finished when the molar ratio of $Fe^{2+}/Fe_t$ is less than 1%, yielding a second mixture;

In this example, the alkali ratio of the hydroxide solution added in steps (3) and (4) totally and the ferrous salt solution is 1.15;

(5) the second mixture obtained in step (4) is filtered and washed with water until the content of $Na^+$ in a filter cake is less than 0.5%, and then is dried at 80° C. to yield amorphous iron oxide hydroxide;

(6) the amorphous iron oxide hydroxide obtained in step (5) is calcined at 350° C. to yield the product.

EXAMPLE 5

The method for preparing magnetic iron oxide $Fe_{21.333}O_{32}$ in this example comprises following steps:

(1) 208.5 g solid $FeSO_4.7H_2O$ is prepared into an aqueous solution having a concentration of 1.5 mol/L, and is placed in a beaker;

(2) 75 g solid NaOH is weighed out and is prepared into an aqueous solution having a concentration of 6 mol/L, and is placed in a beaker;

(3) the hydroxide solution and the ferrous salt solution are mixed in a co-current mariner for reaction, wherein the alkali ratio of above reactants is 0.6 and the reaction temperature is controlled at 20° C., with controlling the ferrous salt solution at a feeding speed of 200 ml/min and the NaOH solution at a feeding speed of 60 ml/min;

(4) after the reaction in step (3) is finished, yielding a first mixture, 100 ml water is added into the first mixture, then blast pump is started to charge air into the first mixture for oxidation for about 15 hours with an introduction amount of air controlled at 720 L/h; and during the oxidation process, the pH value of the first mixture is controlled within a range of 6≤pH≤8, and when the pH value is lower than 6, the NaOH solution is added supplementarily at a feeding speed of 15 ml/min until the pH value reaches about 7.8; and the oxidation is deemed to be finished when the molar ratio of $Fe^{2+}/Fe_t$ is less than 1%, yielding a second mixture;

In this example, the alkali ratio of the hydroxide solution added in steps (3) and (4) totally and the ferrous salt solution is 1.25;

(5) the second mixture obtained in step (4) is filtered and washed with water until the content of $Na^+$ in obtained filter cake is less than 0.5%, and then is dried at 70° C. to yield amorphous iron oxide hydroxide;

(6) the amorphous iron oxide hydroxide obtained in step (5) is calcined at 320° C. to yield the product.

In the above examples, $Fe_t$ is the total content of Ferrum element. $Fe^{2+}/Fe_t$ was determined through potassium dichromate titration method. The content of $Na^+$ was determined through flame spectrometry.

In addition, in step (3) of the present invention, the hydroxide solution and the ferrous salt solution are mixed in a co-current manner for reaction. The term "co-current" means that the hydroxide solution and the ferrous salt solution are respectively fed into a reactor via two pipes at the same time for mixing. Please note that the hydroxide solution and the ferrous salt solution needing to be added in step (3) should be fed into the reactor within a same period.

EXPERIMENTAL EXAMPLE

The products obtained in above examples are characterized via XRD test, and the obtained XRD spectrogram is shown in FIG. 1. The result shows that the product is $Fe_{21.333}O_{32}$.

The purity of the magnetic iron oxide $Fe_{21.333}O_{32}$ products obtained in above examples are measured, and the obtained result shows that magnetic iron oxide $Fe_{21.333}O_{32}$ constitutes 95-98 wt % of the product.

While particular embodiments of the invention have been shown and described, it will be obvious to those skilled in the art that changes and modifications may be made without departing from the invention in its broader aspects, and, therefore, the aim of the appended claims is to cover all such changes and modifications as fall within the true spirit and scope of the invention.

The invention claimed is:

1. A method for preparing magnetic iron oxide $Fe_{21.333}O_{32}$, comprising the following steps:
   (1) preparing a ferrous salt solution with solid soluble ferrous salt;
   (2) preparing a hydroxide solution;
   (3) mixing said hydroxide solution and said ferrous salt solution in a co-current manner for reaction, controlling said hydroxide solution and said ferrous salt solution at an alkali ratio of 0.6-0.8, controlling said ferrous salt solution at a feeding speed of 200-300 ml/min, and said hydroxide solution at a feeding speed of 50-60 ml/min, and controlling the reaction temperature not exceeding 30° C.;
   (4) after the reaction in step (3) is finished, yielding a first mixture, charging the first mixture with a gas containing oxygen for oxidation, and controlling the first mixture at a pH value of 6-8 until the oxidation is finished to yield a second mixture;
   (5) filtering, washing with water and drying said second mixture to yield a precursor; and
   (6) calcining the precursor obtained in step (5) at 250-400° C.

2. The method of claim 1, wherein, the calcining temperature in step (6) is 300-350° C.

3. The method of claim 1, wherein, said hydroxide is a hydroxide of group IA or group IIA elements.

4. The method of claim 1, wherein, said ferrous salt solution has a concentration of 1.3-1.8 mol/L, and said hydroxide solution has a concentration of 4-6 mol/L.

5. The method of claim 4, wherein, in step (4), controlling the first mixture at the pH value of 6-8 comprises adding a further amount of hydroxide solution to the first mixture.

6. The method of claim 5, wherein, in step (4), the further amount of hydroxide solution has a concentration of 4-6 mol/L and a feeding speed of 10-20 ml/min.

7. The method of claim 1, wherein, in step (5), said drying is carried out at a temperature not exceeding 90° C.

8. The method of claim 1, wherein, in step (4), water is added into the first mixture before charging the first mixture with a gas containing oxygen for oxidation.

9. The method of claim 1, wherein, in step (4), the oxidation lasts for 10-15 h.

10. The method of claim 9, wherein, in step (4), the gas containing oxygen is air, and the introduction amount of air is not less than 700 L/h.

11. The method of claim 2, wherein, said hydroxide is a hydroxide of group IA or group IIA elements.

12. The method of claim 2, wherein, said ferrous salt solution has a concentration of 1.3-1.8 mol/L, and said hydroxide solution has a concentration of 4-6 mol/L.

13. The method of claim 12, wherein, in step (4), controlling the first mixture at the pH value of 6-8 comprises adding a further amount of hydroxide solution to the first mixture.

14. The method of claim 13, wherein, in step (4), the further amount of hydroxide solution has a concentration of 4-6 mol/L and a feeding speed of 10-20 ml/min.

15. The method of claim 6, wherein, the total alkali ratio of the hydroxide solutions, including that added for mixing with the ferrous salt solution and these that added for controlling the first mixture at the pH value of 6-8, to the ferrous salt solution is 1.05-1.25.

16. The method of claim 14, wherein, the total alkali ratio of the hydroxide solutions, including that added for mixing with the ferrous salt solution and that added for controlling the first mixture at the pH value of 6-8, to the ferrous salt solution is 1.05-1.25.

17. The method of claim 2, wherein, in step (5), said drying is carried out at a temperature not exceeding 90° C.

18. The method of claim 2, wherein, in step (4), the oxidation lasts for 10-15 h.

* * * * *